United States Patent [19]

Gregg et al.

[11] 4,209,205
[45] Jun. 24, 1980

[54] INSPECTION OF TRACK ASSEMBLIES

[75] Inventors: Anton T. Gregg; Robert E. Murphy, both of East Peoria, Ill.

[73] Assignee: Caterpillar Tractor Co., Peoria, Ill.

[21] Appl. No.: 862,465

[22] Filed: Dec. 20, 1977

[51] Int. Cl.² .......................................... B62D 55/00
[52] U.S. Cl. ........................................................ 305/14
[58] Field of Search .................... 305/14, 11, 58 R; 116/118 R; 73/327; 184/1 C, 96; 301/108 TW, 108 A; 308/92, 101

[56] References Cited

U.S. PATENT DOCUMENTS

| 301,103 | 7/1884 | Eberhard | 301/108 TW |
|---|---|---|---|
| 408,155 | 7/1889 | Wilson | 301/108 TW |
| 3,535,934 | 10/1970 | Rapata | 73/327 |
| 3,568,628 | 3/1971 | Erickson | 73/327 X |
| 3,762,778 | 10/1973 | Boggs et al. | 305/14 |
| 3,796,098 | 3/1974 | Trayer | 73/327 |
| 3,945,693 | 3/1976 | Booth et al. | 305/14 X |

Primary Examiner—Charles A. Marmor
Attorney, Agent, or Firm—Wegner, Stellman, McCord, Wiles & Wood

[57] ABSTRACT

An improved track assembly adapted for use with crawler-type vehicles of the type including a joint having a shaft, an element journalled on the shaft, a lubricant port opening to one end of the shaft and in fluid communication with the interface of the shaft and the element, and a removable plug received in the port for confining lubricant therein. The invention contemplates the improvement wherein the plug is an elastomeric sleeve having a frusto-conical outer surface and a rod of translucent material received within and sealed against the sleeve. The presence or absence of lubricant within the port is ascertained by optical inspection of the end of the rod exterior of the port without removing the plug from the port.

5 Claims, 3 Drawing Figures

INSPECTION OF TRACK ASSEMBLIES

BACKGROUND OF THE INVENTION

This invention relates to track assemblies for use with crawler-type vehicles.

As is well known, track roller assemblies are typically used with crawler-type vehicles and are mounted on track frames intermediate the track sprocket and idler for maintaining the lower run of the track in firm engagement with the underlying terrain. Because crawler-type vehicles are used in extremely hostile environments, it is necessary that the track roller assembly be provided with adequate lubrication or else, due to the immense loads frequently imposed thereon, the track roller assemblies will fail after a very short period of use.

The track assemblies also typically include track pins, that is, shafts, which pivotally interconnect adjacent track links. The interface of each track pin and associated bushing must also be adequately lubricated to prevent failure since they too are heavily loaded and may fail rapidly if abrasive material typically present in the operating environment enters the joint.

Servicing of such components in the field is quite cumbersome and, due to the high cost of crawler-type vehicles, the extensive downtime associated with servicing is to be avoided.

As a consequence, during fabrication of crawler-type vehicles, considerable effort is made to inspect the track assemblies to ensure that they have been provided with lubricant. Notwithstanding the inspection techniques that have evolved to date, occasionally a vehicle will leave the place of manufacture with one or more of its track roller assemblies or track pins free of lubricant. Failure due to lack of lubrication can be anticipated shortly thereafter. Thus, there remains the need for a foolproof means of inspecting track roller assemblies or track pins to ensure that they are provided with lubricant at the time the vehicle employing the same is first readied for use after manufacture.

Moreover, replenishment of lubricant in the track roller assembly or in track pins is from time to time required. In the typical assembly, it is necessary to remove a plug from a bore in the shaft of the assembly to determine whether there is lubricant present and, if not, to add lubricant. Where the lubricant supply is adequate, removal of the plug and subsequent replacement is, in a sense, a wasted effort since no servicing is required. Thus, the time spent in the removal and replacement of plugs without the addition of lubricant is an expense to the owner of the vehicle, albeit a necessary one, to ensure that failure due to lack of lubricant will not take place. Clearly, it would be advantageous to eliminate or minimize such expense and yet be able to ensure that adequate lubricant is present to prevent failure.

SUMMARY OF THE INVENTION

The present invention is directed to overcoming one or more of the above problems.

According to the present invention, there is provided an improved means for determining lubricant level in rotary joints such as track roller assemblies or track pins utilized in track assemblies. A lubricant port opens to one end of the shaft of the joint and is in fluid communication with the interface of the shaft and the roller or track link, as the case may be, and a removable plug received in the port for confining lubricant therein. The inventive improvement contemplates that the plug be at least partially formed of translucent material extending from end to end of the plug so that the presence or absence of lubricant within the port can be ascertained by optical inspection of the translucent material exterior of the port without removing the plug from the port to facilitate inspection and/or maintenance.

Other objects and advantages will become apparent from the following specification taken in connection with the accompanying drawings.

DESCRIPTION OF THE PREFERRED EMBODIMENT

Figure 1:
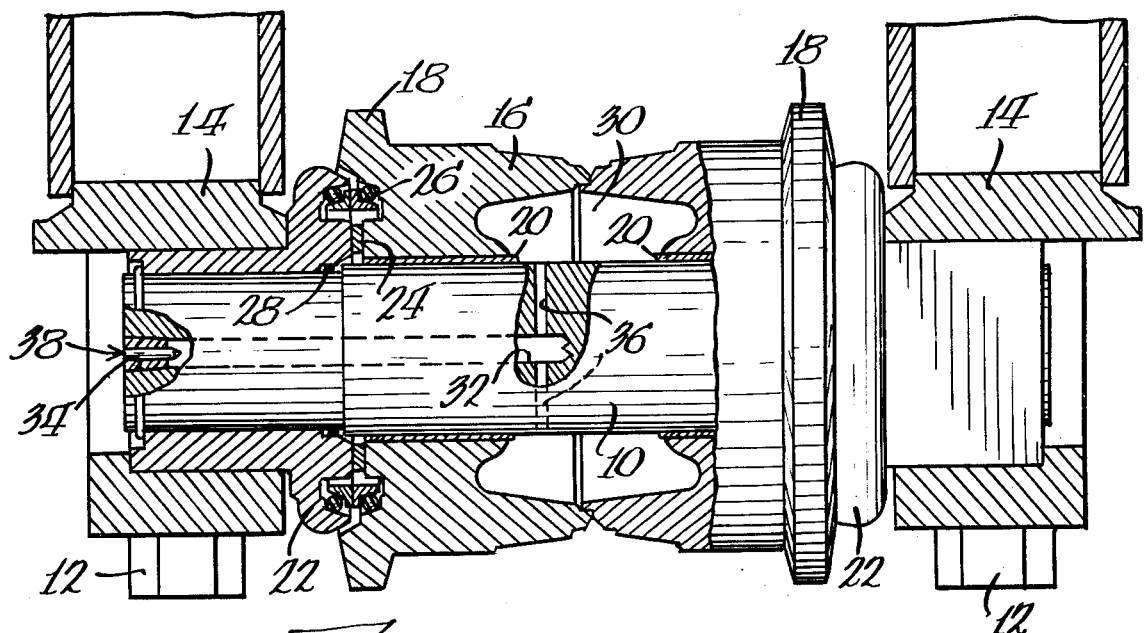
FIG. 1 is an elevational view of a track roller assembly mounted on the track frame of a crawler-type vehicle with parts shown in section for clarity and embodying the invention.
Figure 2:
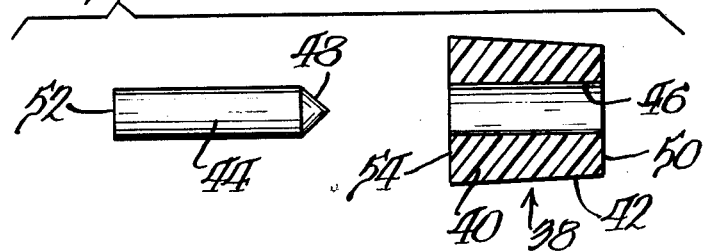
FIG. 2 is an exploded view of a lubricant port plug utilized.

An exemplary embodiment of a track roller assembly made according to the invention is illustrated in FIG. 1 and is seen to include an elongated shaft 10 secured as by bolts 12 to the underside of spaced rails 14 forming the track frame of a crawler-type vehicle.

A roller 16 having track guiding flanges 18 on its exterior surface is journalled on the shaft 10 by means of bearings 20. End collars 22 are disposed on opposite ends of the shaft 10 intermediate the rails 14 and thrust washers 24 (only one of which is shown) are interposed between the sides of the roller 16 and the end collars 22. Suitable seals 26 and 28 are disposed where indicated at both end collars 22 to prevent lubricant from leaking out of the assembly.

The roller 16, on its interior surface, includes an annular, enlarged cavity 30 which serves as a lubricant reservoir. The shaft 10 has an axial bore 32 opening at 34 in an end of the shaft 10 to define a lubricant receiving port. Radial bores 36 aligned with the cavity 30 establish fluid communication from the bore 32 to the cavity 30 so that the latter may be filled with lubricant which then lubricates the interface of the roller 16 and the shaft 10.

A plug, generally designated 38, normally closes the port 34 to confine lubricant within the bore 32, the bores 36 and the cavity 30. According to the present invention, the plug 38 is defined by an elastomeric sleeve 40 formed of rubber or the like and of the type that will not deteriorate when exposed to petroleum products. The sleeve 40 has a frusto-conical outer surface 42 so that the same may be wedged into the port 34 to remain in place therein. However, if desired, other exterior configurations, including interengaging configurations on the outer surface of the sleeve 40 and the inner surface of the port 34 could be used.

The plug 38 is also formed of translucent material extending from end to end of the same. As used herein, translucent material is any material capable of transmitting light, with or without diffusion and may include transparent material. The translucent material is in the form of a rod 44 which is removably but snugly received within the bore 46 of the sleeve 40. In one embodiment, the rod 44 may be formed of "Lucite".

The rod 44 has an axial length greater than that of the sleeve 40 so that, as seen in FIG. 1, a pointed end 48 thereof extends from the minor base 50 of the sleeve 40. In a preferred embodiment, the pointed end 48 is conical and its surface extends at an angle of about 45° to the longitudinal axis of the rod 44. Preferably, the pointed end 48 is polished as well, as is the opposite end.

The end 52 of the rod 44, when the latter is disposed within the sleeve 40, may be flush with the major base 54 of the sleeve 40, as illustrated in FIG. 1, and serves as a location whereat an optical inspection may be made to determine whether there is lubricant within the assembly. In particular, when a lubricant such as oil within the bore 32 is present and contacts the pointed end 48 of the rod 44, reflection of light thereat, which light is introduced through the end 52, is reduced so that the end 52 appears dark to the human eye or an optical instrument. When the lubricant is not in contact with the pointed end 48, a great degree of reflection exists at the pointed end 48 so that the end 52 appears to be light.

Thus, for production control purposes, or for servicing inspections in the field, it is only necessary to optically inspect the end 52 to determine whether there is a proper amount of lubricant within the assembly.

The light necessary can be provided in any of a variety of ways. In many instances, ambient light will be sufficient, while occasionally, a flashlight may be utilized. For production inspection purposes, light may be directed to the base 52 by, for example, fiber optics.

Detection of reflection can be made visually by the human eye or by, for example, a photocell detector either exposed directly to the end 52 or functionally related thereto by, for example, fiber optics.

Thus, it will be appreciated that the invention lends itself to use in both mechanised and manual inspections, both at a manufacturing facility or in the field.

It will also be observed that the invention is not limited to use with track roller assemblies of the type specifically disclosed herein, but may be employed with efficacy in rotary joints requiring lubrication, such as sealed and lubricated track pins interconnecting the links in a crawler-type track.

Figure 3:
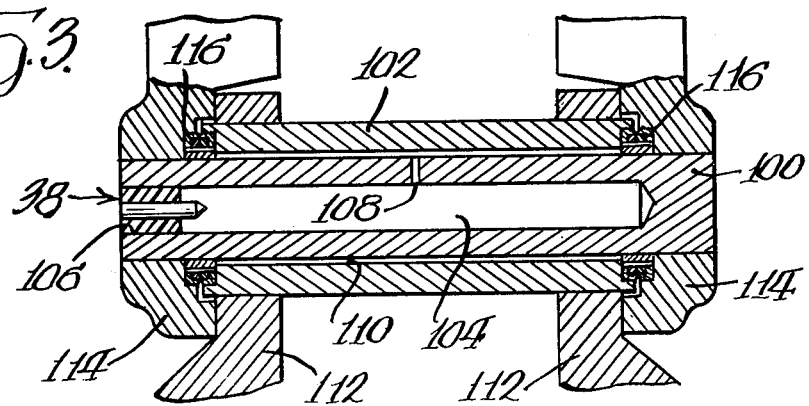
FIG. 3 is a sectional view of track links interconnected by a track pin utilizing the invention.

One typical construction is illustrated in FIG. 3 wherein a shaft in the form of a track pin 100 journals a bushing 102 and will typically be horizontally disposed when applied to a crawler-type vehicle. The pin 100 includes a bore 104 which serves as a lubricant reservoir and opens at one end 106 to the end of the pin 100 to define a lubricant receiving port.

A radially extending bore 108 in the pin 100 extends to a small annular space 110 defined by a 0.010 inch clearance and the interface of the pin 100 and the bushing 102 to direct lubricant from the reservoir to such interface.

The ends of the bushing 102 are captured in legs 112 at the reduced width end of a conventional track link. The ends of the pin 100 are captured in legs 114 at the large width end of an adjacent, conventional track link, thereby interconnecting the adjacent track links. Seals 116 of conventional construction interengage the pin 100, respective ends of the bushing 102 and the interior surfaces of the legs 114 to prevent the leaking of lubricant from the interface of the pin 100 and the bushing 102 and to prevent the entry of foreign, typically abrasive, material into such interface.

A plug 38, identical to that previously described, is lodged in the port 106 to retain lubricant within the reservoir defined by the bore 104.

The invention, probably in its most advantageous form, is applied to shafts in the form of track pins 100. In the usual crawler-type vehicle, there will be a far greater number of track pins 100 than track roller assemblies. The considerably larger number of track pins employed makes it much more difficult to inspect each individual track pin as opposed to each individual track roller assembly. Consequently, the time savings for inspection during manufacture or in the field is far greater when the invention is applied to track pins.

Needless to say, however, the invention provides advantages in both. And, it may be utilized in other applications wherein pins that are generally horizontally disposed when in their intended environment and which require lubrication are employed. For example, the invention can be utilized with efficacy in track idlers, track carrier rollers, cartridge pins for bogey suspensions and cartridge pins for bucket arms or the like, just to name a few.

In such uses, the particular construction of the plug 38 described previously possesses a number of advantages. The pointed end 48 extending from the minor base 50 of the sleeve 40 facilitates drainage of the pointed end 48 so that a residual oil film will not provide an improper indication. The removability of the rod 44 from the sleeve 40 allows the rod to be employed as a vent in lieu of threaded fasteners utilized heretofore in assemblies of the type of concern.

The embodiments of the invention in which an exclusive property or privilege is claimed are defined as follows:

1. In a track assembly adapted for use with crawler-type vehicles and including a shaft adapted to be disposed in a substantially horizontal position, an element journalled on the shaft; a lubricant port opening to one end of the shaft and in fluid communication with the interface of the shaft and the element, and a removable plug received in said port for confining lubricant therein, the improvement wherein said plug is at least partially formed of translucent material extending from end to end of the plug so that the presence or absence of lubricant within said port can be ascertained by optical inspection of the translucent material exterior of the port without removing the plug from the port to facilitate inspection and/or maintenance said plug comprising an elastomeric sleeve having a frusto-conical outer surface and said transparent material comprising a rod received within and sealed against said sleeve and having a pointed end within said port.

2. The track assembly of claim 1 wherein said rod is removably received in said sleeve so as to be additionally usable as a vent plug.

3. The track assembly of claim 1 wherein said pointed end extends from the minor base of said sleeve to facilitate draining of residual lubricant from the minor base.

4. The track assembly of claim 1 wherein said element comprises a flanged track roller.

5. The track assembly of claim 1 wherein said shaft is a track pin and said element is a track link.

* * * * *